March 25, 1969 C. E. McMANAMA 3,434,514
MACHINE FOR SAWING LUMBER FROM HOLLOW LOGS
Filed Oct. 21, 1965

INVENTOR
CHARLES E. McMANAMA

United States Patent Office 3,434,514
Patented Mar. 25, 1969

3,434,514
MACHINE FOR SAWING LUMBER FROM HOLLOW LOGS
Charles E. McManama, Potlatch, Idaho 83855
Filed Oct. 21, 1965, Ser. No. 499,250
Int. Cl. B27b 5/18
U.S. Cl. 143—47                5 Claims

ABSTRACT OF THE DISCLOSURE

A portable machine for sawing lumber from prostrate hollow logs where they lie having a circular saw which traverses upon a log in sawing, a rail to accurately guide the course of the saw through the log, and means of engagement to the log which also serves to adjust the machine radially upon the log to saw successive boards therefrom.

---

Conventional lumber sawing machines in many cases are inadequate to efficiently saw lumber from hollow logs. This invention is expressly for the purpose of sawing such hollow logs, or logs having only a thin outside shell of sound wood. Special advantages are hand portability where the log may be conveniently sawed at the site of the fallen tree, tolerance of dirty logs whereby the saw stays sharp longer, low cost construction, and recovery in the form of vertical grained lumber. While the significance of many of these advantages is relative, the invention is indeed unique in use, although it can also be used in some cases for the sawing of whole logs.

Essentially, the invention is a circular saw which traverses in sawing upon a guide rail that rests upon a log. The guide rail resting upon the log is rigidly attached to each end of the log by an engagement means consisting of a tractive wheel at each end of the log. The engagement of these wheels is accomplished by adjustment means in the linkage thereof. The turning of these wheels moves the guide rail assembly laterally on the circumference of the log, thereby adjusting the setting of the saw to make a cut, or any successive cut in the log.

To compensate for the roundness of the log, the tractive wheel is mounted upon an inclined axis so that when successive cuts are sawed, the machine will be maintained upon the circumference of the log being sawed.

Pneumatic rubber tired wheels are especially suitable since a tractive surface is provided that conforms to the end of the log with a large contacting surface area regardless of the angle of the wheel's axis, which is adjustable in order to follow the circumference of either a large or small diameter log.

Without a correcting means, lumber sawed by this type of machine will have a tapered thickness laterally. To compensate, means of angular adjustment of the saw carriage upon its supporting rail assembly is provided that corrects the saw angle to the log so that boards with parallel faces will be sawed. To maintain this parallel quality in successive boards, a bubble level indicator is adjustably affixed upon the machine by which the aforesaid means of adjustment can be accurately set for each cut. Each successive cut adjusted to the same level indication will be parallel.

Since the log is round and the machine rides upon its circumference, the number of parallel cuts is obviously limited. Therefore, after one series of parallel cuts is sawed, the saw carriage is adjusted to saw a different series of parallel cuts. With the beginning of each series of cuts the level indicator is reset, and any following series of cuts is completed in the same manner as the first series of cuts. As repeated series of cuts are sawed, the log is rolled so that the machine retains its position on top thereof.

Figure 1:
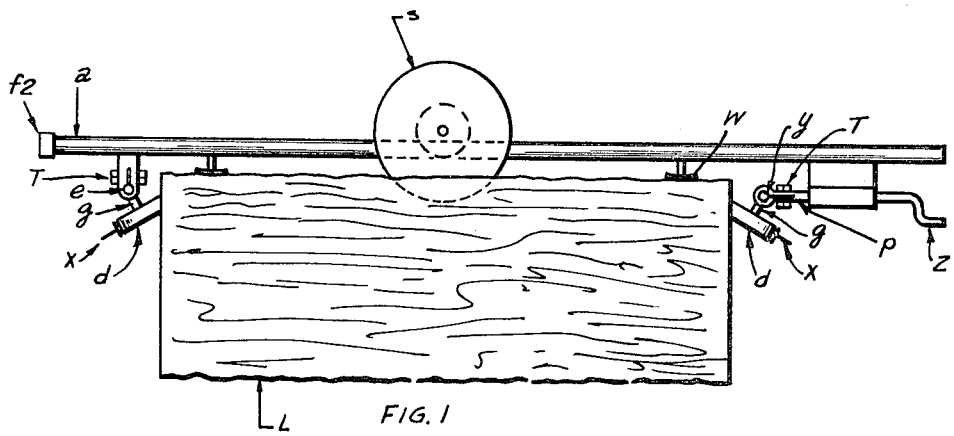
Figure 2:
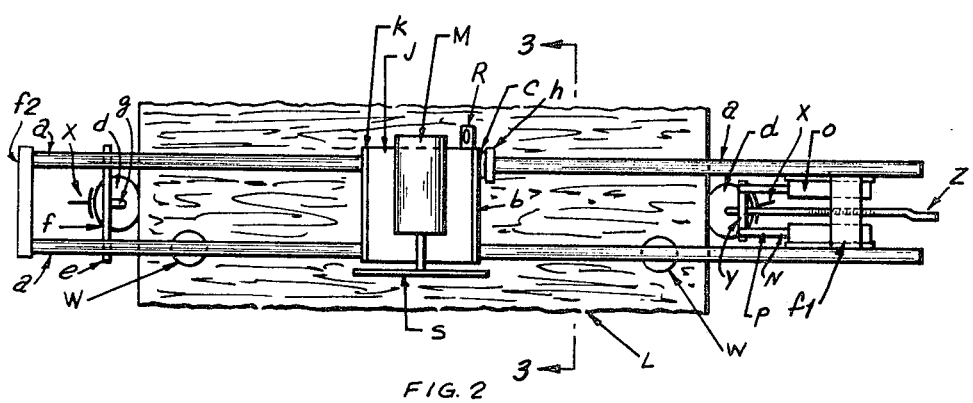
Figure 3:
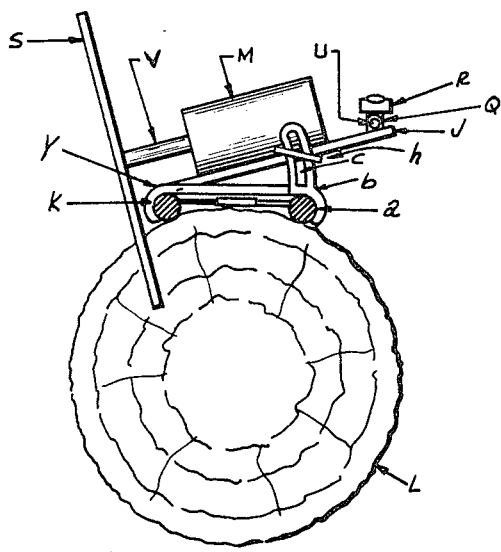

The advantages as they reside in the details of construction are more fully hereinafter described, reference being had to the accompanying drawing in which:

FIGURE 1 is a side view of the sawmill upon a log.
FIGURE 2 is a top view of the sawmill upon a log.
FIGURE 3 is a sectional end view of the sawmill as seen from line 3—3 in FIGURE 2.

Referring now in detail to the drawing, it will be seen that the embodiment of the invention illustrated comprises an elongate generally rectangular frame of parallel side rails $a$ at one end of which is fixed cross member $f2$ and pivotally mounted cross member $e$ and at the other end of which is fixed cross member $f1$ with telescoping adjustment linkage $n$ consisting of tubular guide members $o$ and internal guide members $p$ to which is attached pivotally mounted cross member $y$. Upon both pivotal cross members $e$ and $y$ are fasteners $t$ consisting of a screw or other common means of rigidly locking or releasing members $e$ and $y$ to any desired pivotal position. Upon these members $e$ and $y$ are shafts $g$ which carry pneumatic tired wheels $d$ which are engaged to each end of log $l$. Upon each wheel $d$ is a brake $x$ which retains the wheel in position after being turned. Turning of wheel $d$ can be accomplished by hand after releasing brake $x$. Turning each wheel in opposite rotation to the other results in moving the guide rail assembly laterally upon the log. Telescoping adjustment linkage $n$ is actuated by simple mechanical means such as crank screw $z$.

The embodiment of the invention is also seen to comprise saw carriage $b$ which slidably traverses upon side rails $a$. Generally mounted upon saw carriage $b$ is saw $s$, motor $M$, means of said angular adjustment in hinge $Y$, means of indicating angular adjustment in bubble level indicator $R$, and means of retaining angular adjustment in slot $c$. Saw $s$ is driven directly from motor $M$ by shaft $V$ in a direction of rotation which draws the sawdust up and toward the direction of feed. This rotation permits the sawing of dirty logs with minimum dulling of the saw teeth. Saw $s$ is adjusted angularly to the log upon hinge $Y$ which connects slidable carriage base $K$ to pivotal frame $J$ which supports such components as saw $s$, motor $M$, bubble level indicator $R$, and thumb screw assembly $h$. Pivotal frame $J$ pivots upon hinge $y$ and is rigidly retained in desired angular adjustment by thumb screw assembly $h$ which is engageable upon slot $c$ which is mounted upon slidable base $K$. Bubble level indicator $R$ is pivotally mounted upon level indicator bracket $Q$ on pivotal frame $J$ by rivet $U$ which is adapted to hold level indicator $R$ in any setting until reset by the operator.

The embodiment of the invention seen also includes a means by which side rails $a$ ride upon the log with a minimum interference from irregularities upon the face of the log such as knots and swells comprising adjustable legs $W$ therefrom adapted with broad bases which are slidable upon the face of the log and are desirably spaced in such a manner as to provide maximum rail support with a minimum of adjusting, three point support requiring the least adjusting generally.

To operate the machine once placed upon the log and tractive wheels $d$ are engaged, the saw $s$ is fed through the log either manually or means of power feed of which many forms are common. After the cut is completed the saw is returned to the starting position, whereupon tractive wheels $d$ are turned to the desired setting, moving the entire machine laterally upon log $L$ a desired distance. After this is accomplished thumb screw assembly $h$ is loosened in slot $c$ and pivotal frame $J$ is adjusted to a position where bubble level indicator $R$ registers the same level measurement as indicated at the time the first cut was being made. A cut is then again made, and so on in repeated sequence until the saw fails to cut sufficiently through to the hollow center. At this stage the angular adjustment of the saw carriage is adjusted to the opposite extreme after properly resetting the tractive wheels *d* and after level indicator R is reset upon its bracket Q oriented to this new position, the process is repeated as aforedescribed.

Having hereby described a preferred form of my invention which I desire to protect by Letters Patent, I claim:

1. In a lumber sawing machine comprising a circular saw, a carriage carrying said circular saw, a guide rail mounted on a log longitudinally thereof, said carriage traversable upon said guide rail, and said guide rail having a means to rigidly engage each end of the log while resting upon the log; said means for engaging each end of the log each comprising a tractive wheel having its axis inclined at an angle to the axis of the engaged log so that said rail and said carriage will move around the circumference of the log when the wheels are rotated while engaged with the ends of the log, means to retain said wheel in any desired setting around the log while engaged with the log, and means for adjusting said wheel toward and away from the other to engage and disengage the ends of the log.

2. In a lumber sawing machine as set forth in claim 1, the aforesaid saw supporting carriage having means of pivotal adjustment upon an axis parallel to the traversement thereof to change the angle of the saw to the log, and means to hold said adjustment.

3. In a lumber sawing machine as set forth in claim 2, a level indicator pivotally attached upon the pivotally adjustable portion of the aforesaid carriage, and a locking means to hold any pivotal setting desired thereof.

4. In a lumber sawing machine as set forth in claim 3, the inclined axes of aforesaid tractive wheels having means of angular adjustment toward or away from the log.

5. In a lumber sawing machine as set forth in claim 4, means to accommodate the guide rail to irregularities along the log comprising legs from said rail having bases extending to the log, said bases contacting the log and slidable upon the log.

References Cited

UNITED STATES PATENTS

| 120,468 | 10/1871 | Tolan | 143—59 |
| 2,254,293 | 9/1941 | Kaehlert | 143—47 |

FOREIGN PATENTS

| 18,886 | 3/1929 | Australia. |

DONALD R. SCHRAN, *Primary Examiner.*

U.S. Cl. X.R.

144—312